Figure 1:
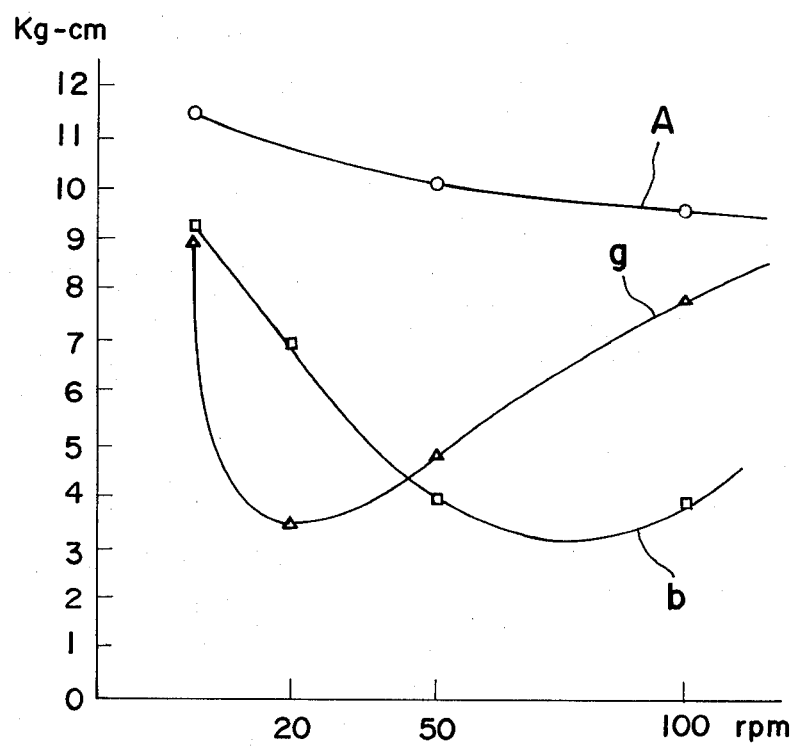

United States Patent [19]

Yasui

[11] Patent Number: 4,464,275

[45] Date of Patent: Aug. 7, 1984

[54] RUST PREVENTIVE OIL FOR A LOW FRICTIONAL TORQUE TAPERED ROLLER BEARING

[75] Inventor: Hiroyoshi Yasui, Osaka, Japan

[73] Assignee: Koyo Seiko Co., Ltd., Osaka, Japan

[21] Appl. No.: 424,327

[22] Filed: Sep. 27, 1982

[30] Foreign Application Priority Data

Mar. 7, 1980 [JP] Japan .................................. 55-29494

[51] Int. Cl.³ .............................................. C10M 1/48
[52] U.S. Cl. ............................. 252/32.7 E; 252/52 R; 252/56 R; 252/33.4; 208/19
[58] Field of Search .................... 252/327 E, 52, 56 R, 252/33.4

[56] References Cited

U.S. PATENT DOCUMENTS 3,873,455 3/1975 Schiemen ........................ 252/32.7 E
3,984,599 10/1976 Norton ............................ 252/32.7 E
4,282,106 8/1981 Schaap et al. .................. 252/32.7 E

*Primary Examiner*—Jacqueline V. Howard
*Attorney, Agent, or Firm*—Wegner & Bretschneider

[57] ABSTRACT

A rust preventive oil comprising a base oil having a viscosity of from 10 to 20 centistokes at 40° C. which consists of from 70 to 80 percent by weight of low viscosity mineral oil and from 10 to 20 percent by weight of high viscosity mineral oil and additives such as barium sulphonate, wax or ester thereof, amine, higher alcohol, antioxidant and non-corrosive extreme pressure additive is beneficially suited for the high precision low frictional touque tapered roller bearing.

5 Claims, 3 Drawing Figures

RUST PREVENTIVE OIL FOR A LOW FRICTIONAL TORQUE TAPERED ROLLER BEARING

The present invention relates to a rust preventive oil for a low frictional torque tapered roller bearing used in a pinion bearing of a differential gear device of a motorcar and the like.

Although the tapered roller bearing is used under an axially applied preload in order to fulfill its function effectively, the preload is generally controlled indirectly by measuring the torque from outside because the preload cannot be measured directly after installation.

The tapered roller bearing is coated with a rust preventive oil at the time of forwarding. In the case of the pinion bearing of a differential gear device having very low frictional torque, this kind of rust preventive oil should have a constant viscosity in order to produce a constant preload by measuring the torque. Rust preventive oils which change in quality with time are also unsuitable for tapered roller bearings.

Examples of rust preventive oils hitherto generally in use for the tapered roller bearing are a solvent-diluting type rust preventive oil (JIS K 2246, NP-3 and the like), a general rust preventive oil (JIS K 2246, NP-7, NP-9, NP-10 and the like), mixtures thereof and the like.

When the aforementioned low frictional torque tapered roller bearing in which anti-seizure properties are improved is coated with the rust preventive oil hitherto in use, the following come into question.

(1) In the case of a high precision low frictional torque tapered roller bearing for a differential gear device, frictional torque becomes extremely low and another suitable oil must be coated in order to control the preload at time of installation because the measurement of preload becomes impossible for the coated bearing with the rust preventive oil.

(2) Control of the preload by measuring the torque at time of installation becomes remarkably difficult as the frictional torque of the tapered roller bearing coated with the rust preventive oil very often changes between packing-forwarding and use.

(3) The preload at time of installation cannot be controlled sufficiently as the frictional torque of the tapered roller bearing coated with the rust preventive oil changes significantly according to rotary speed.

(4) Insufficient anti-seizure between installation and lubricant supply is obtained because of unsatisfactory initial lubricity (anti-seizure) based on only the rust preventive oil.

On the other hand, U.S. Pat. No. 3,695,391 discloses that the use of a corrosion resistant oil comprising a major portion having a viscosity not exceeding 25 centistokes at 20° C. to coat or lubricate the bearings of an axle pinion drive shaft permits installing and adjusting said bearings on the shaft within predetermined limits of prestressing and frictional moments relative to the rotary speed of the shaft.

However it has been found that such a corrosion resistant oil whose viscosity is relatively low does not permit an optimum running torque and does not give excellent lubricity and anti-seizure properties.

It is an object of the present invention to provide a rust preventive oil for the low frictional torque tapered roller bearing, which has excellent anti-seizure properties and no change in quality with time, and therefore which can be utilized as a lubricant in a measurement of the torque at time of installation and makes control of preload easy.

Accordingly the present invention provides a rust preventive oil for the low frictional torque tapered roller bearing, comprising a base oil having a viscosity of from 10 to 20 centistokes at 40° C. which consists of from 70 to 80 percent by weight of a low viscosity mineral oil and from 10 to 20 percent by weight of a high viscosity mineral oil, from 3 to 8 percent by weight of a barium sulphonate, from 3 to 8 percent by weight of a wax or ester thereof, from 1 to 3 percent by weight of an amine and a higher alcohol, from 0.1 to 0.8 percent by weight of an antioxidant and from 3 to 10 percent by weight of a non-corrosive extreme pressure additive.

The rust preventive oil according to the present invention consists of the base oil and various additives.

Differing from the rust preventive oil hitherto in use, the base oil used in the present invention consists of from 70 to 80 percent by weight of a low viscosity mineral oil having a viscosity of from 8 to 12 centistokes at 40° C. and from 10 to 20 percent by weight of a high viscosity mineral oil having a viscosity of from 15 to 20 centistokes at 40° C.

The viscosity of the base oil is from 10 to 20 centistokes at 40° C. (ca. from 26 to 50 centistokes at 20° C.). A base oil whose viscosity of less than 10 centistokes at 40° C. lowers lubricity and is apt to change in quality with time. A base oil whose viscosity is more than 20 centistokes at 40° C. forms too thick a film of the lubricating oil and decreases workability. When the low frictional torque tapered roller bearing is coated with the oil comprising the base oil whose viscosity is from 10 to 20 centistokes at 40° C., optimum running torque is obtained and the fluctuation of the torque value with rotary speed change is small.

When the amount of the high viscosity mineral oil is less than 10 percent by weight, the running torque changes with time and the lubricity decreases. When an amount of the high viscosity mineral oil is more than 20 percent by weight, stability of running torque value against rotary speed change and workability decreases.

By adding from 0.1 to 0.8 percent by weight of an antioxidant such as 2,6-di-t-butyl-p-cresol into the base oil, vaporization and degeneration of the ingredients of the rust preventive oil are prevented and the change of running torque with time becomes small. The effect of the antioxidant is not varied by adding more than 0.8 percent by weight thereof.

By adding from 3 to 10 percent by weight of a non-corrosive extreme pressure additive such as zinc dialkyldithiophosphate into the base oil, excellent lubricity and anti-seizure properties are obtained. An amount of less than 3 percent by weight of the extreme pressure additive does not give this effect. The effect of the extreme pressure additive is not varied by adding more than 10 percent by weight thereof.

By adding from 3 to 8 percent by weight of a barium sulphonate such as barium dinonylnaphthalene sulphonate and barium alkylbenzenesulphonate, from 3 to 8 percent by weight of a wax such as paraffin wax oxide and esters thereof and from 1 to 3 percent by weight of other conventional additives, for example amine such as octylated diphenylamine and p-isopropoxydiphenylamine and higher alcohols such as sorbitan monooleate and pentaerythritol monooleate into the base oil, a long-term rust preventive property is obtained and the resultant rust preventive oil does not change in quality with time.

Barium sulphonate gives excellent humidity resisitance and lubricity to the rust preventive oil. The necessary amounts of barium sulphonate are from 3 to 8 percent by weight. The effect of barium sulphonate is not varied by employing more than 8 percent by weight thereof.

The wax or esters thereof give a superior film-reinforcing property to the rust preventive oil. The necessary amounts of wax or esters thereof are from 3 to 8 percent by weight. An amount of more than 8 percent by weight of wax or esters thereof diminishes a stability of torque with rotary speed.

As stated above the rust preventive oil according to the present invention is characterized in that it comprises the base oil consisting of from 10 to 20 percent by weight of a high viscosity mineral oil and from 70 to 80 percent by weight of a low viscosity mineral oil, from 3 to 8 percent by weight of a barium sulphonate, from 3 to 8 percent by weight of a wax or ester thereof, from 3 to 10 percent by weight of an extreme pressure additive, from 0.1 to 0.8 percent by weight of an antioxidant and from 1 to 3 percent by weight of other conventional additives such as amines and higher alcohols.

By the synergistic effect of these ingredients, change of frictional torque with time is prevented and the extreme pressure properties of the oil are improved remarkably.

The present invention is illustrated by the following example.

EXAMPLE

The rust preventive oil (A) for the low frictional torque tapered roller bearing whose viscosity is ca. 14 centistokes at 40° C. (ca. 30 centistokes at 20° C.) was prepared by blending 73 percent by weight of low viscosity mineral oil, 10 percent by weight of high viscosity mineral oil, 5 percent by weight of barium sulphonate, 5 percent by weight of wax ester, 0.5 percent by weight of amine, 1.3 percent by weight of higher alcohol, 0.2 percent by weight of di-t-butyl-p-cresol and 5 percent by weight of zinc dialkyldithiophosphate.

Table 1 shows the properties of the rust preventive oil (A) according to the present invention and the rust preventive oils (a) and (b) heretofore in use.

FIG. 1 is a graph of the torque (Kg-cm) as a function of rotary speed (rpm) in the bearing (load; 500 Kg.f, bearing type; HM 89449/10).

Figure 2:
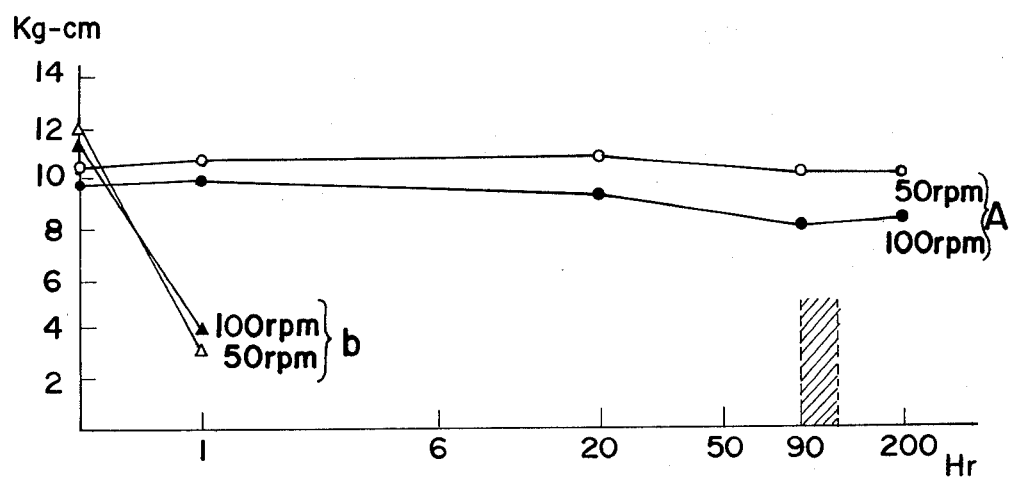

FIG. 2 is a graph of the running torque (Kg-cm) as a function of the passage of time (hour) (load; 500 Kg.f, bearing type; HN 89449/10). In the case of this measurement the bearing was held at 60° C. without packing.

Figure 3:
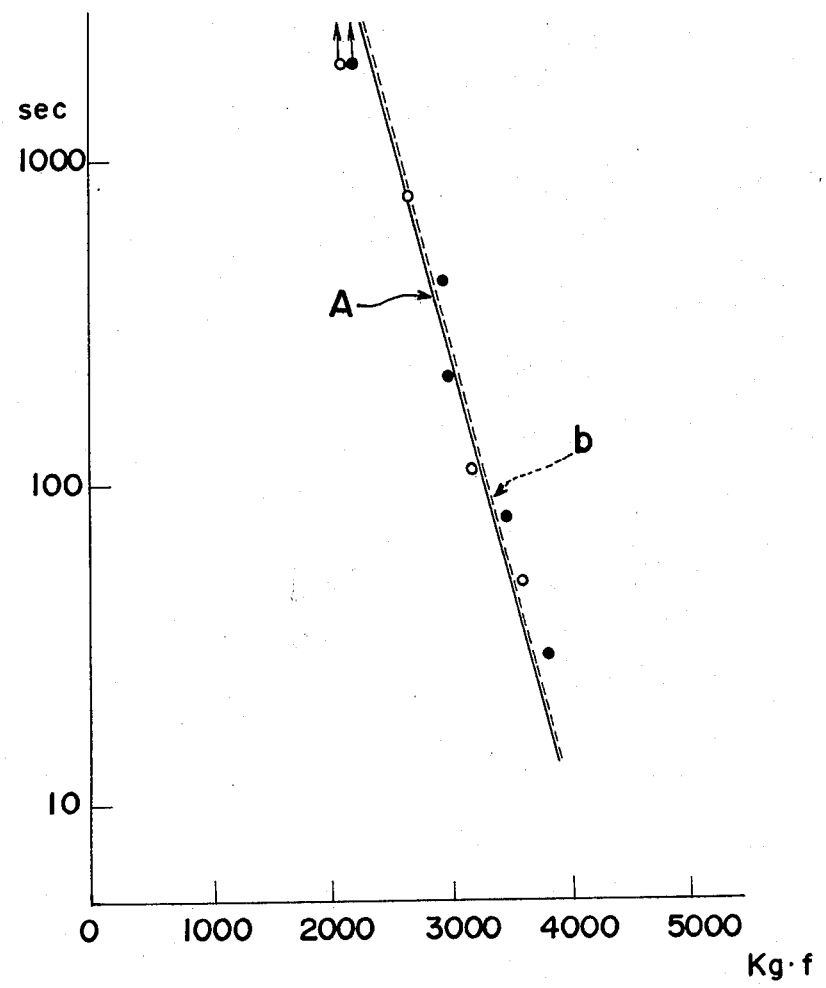

FIG. 3 is a graph of the thrust load (kg.f) as a function of necessary time (sec) for occurrence of seizure (rotary speed; 1500 rpm, bearing type; HM 88542/10).

TABLE 1

| properties | rust preventive oil example A | comparative example a[10] | comparative example b[11] |
|---|---|---|---|
| flashpoint (°C)[1] | >150 | 38 | 40 |
| viscosity (cst/40° C.)[2] | 10–20 | 5–15 | 5–15 |
| film thickness (μm)[3] | 5–10 | 9–11 | 10–12 |
| humidity cabinet test[4] (hour) | 450 | 400 | 400 |
| dew cycle weathering test[5] (hour) | 60–80 | 40–60 | 60–80 |
| salt spray test (hour)[6] | 10–20 | 10–15 | 10–20 |
| weathering test (month)[7] | >6 | >6 | >6 |
| corrosion resistance test[8] | 1a | 2a | 1b |
| starting torque (g-cm)[9] | 10–12 | 8–9 | 10–12 |
| running torque change caused by rotary speed change[9] | small | large | large |
| running torque change with time[9] | small | large | large |
| initial lubricity (second)[9] | 250 | 80 | 200 |

[1]JIS K2359
[2]JIS K2283
[3]JIS Z0236
[4]JIS Z0236
[5]In accordance with JIS Z0236
[6]JIS Z0236
[7]Left the bearing packed with polyethylene film in the weathering test box.
[8]JIS Z0236 (100° C. × 3H)
[9]thrust load; 500–4000 Kg · f, rotary speed; z 50–500 rpm
[10]kerosine 65%, petrolatum 20%, paraffinic mineral oil 5%, petroleum barium sulphonate 5%, sorbitan monooleate 4%, 2,2'-methylene-bis(4-methyl-6-t-butyl-phenol) 1%
[11]white spirit 60%, purified petrolatum 20%, paraffinic mineral oil 10%, barium alkylnaphthalenesulphonate 5%, zinc trialkyl dithiophosphate 3%, di-2,6-t-butyl-p-cresol 2%

As shown in FIG. 1, the variation of torque value with the change of rotary speed by using the rust preventive oil (A) according to the present invention is very small in comparison with that of the rust preventive oil (b) heretofore in use or hypoid gear oil (SAE90, 214cst/40° C.) (g). Therefore an adjustable control of preload applied to the tapered roller bearing, particularly low frictional touque tapered roller bearing, which can hardly be achieved by using the rust preventive oil heretofore in use or hypoid gear oil, can be carried out very easily by using the rust preventive oil according to the present invention.

As shown in FIG. 2, the change of running torque in the tapered roller bearing with time by using the rust preventive oil (A) according to the present invention is remarkably small in comparison with that of the rust preventive oil (b). After the passage of the time (90–120 hours) indicated with oblique lines in FIG. 2 corresponding to from 3 to 6 months after coating of the rust preventive oil (A) according to the present invention, the control of the preload applied to the tapered roller bearing can be easily carried out without retreatment or supply of lubricant.

Further as shown in FIG. 3, the initial lubricity (anti-seizure) of the rust preventive oil (A) according to the present invention is almost the same as that of the rust preventive oil (b).

The workability, the rust preventive property and the like of the rust preventive oil (A) according to present invention are excellent as shown in the aforementioned Table 1.

As mentioned above, the rust preventive oil according to the present invention brings its ability into full play for the tapered roller bearing. The control of the preload of the low frictional torque tapered roller bearing, which is developed as a low frictional torque and high rotary speed bearing, by measuring the torque can easily be carried out in a coated state with the rust preventive oil by using the rust preventive oil according to the present invention without coating any other lubricant on the bearing. Furthermore the workability of an installation of an differential gear device for a motor-car on the spot is improved remarkably because the rust preventive oil according to the present invention plays a role as a lubricant in the installation of said device.

What is claimed:

1. A rust preventive oil for low frictional torque tapered roller bearings, comprising a base oil having a viscosity of from 10 to 20 centistokes at 40° C. which consists of from 70 to 80 percent by weight of a low viscosity mineral oil having a viscosity of from 8 to 12 centistokes at 40° C. and from 10 to 20 percent by weight of a high viscosity mineral oil having a viscosity of from 15 to 20 centistokes at 40° C., from 3 to 8 percent by weight of a barium sulphonate, from 3 to 8 percent by weight of a wax or ester thereof, from 1 to 3 percent by weight of an amine and a higher alcohol, from 0.1 to 0.8 percent by weight of 2,6-di-t-butyl-p-cresol, and from 3 to 10 percent by weight of zinc dialkyldithiophosphate.

2. The rust preventive oil according to claim 1, wherein the barium sulphonate is barium dinonylnaphthalene sulphonate or barium alkylbenzene sulphonate.

3. The rust preventive oil according to claim 1, wherein the wax is paraffine wax oxide.

4. The rust preventive oil according to claim 1, wherein the amine is octylated diphenylamine or p-isopropoxydiphenylamine.

5. The rust preventive oil according to claim 1, wherein the higher alcohol is sorbitan monooleate or pentaerythritol monooleate.

* * * * *